(12) United States Patent
Sretenovic

(10) Patent No.: US 8,380,889 B2
(45) Date of Patent: Feb. 19, 2013

(54) DISTRIBUTED PERIPHERAL DEVICE MANAGEMENT SYSTEM

(75) Inventor: Dragan Sretenovic, Marlton, NJ (US)

(73) Assignee: Oki Data Americas, Inc., Mt. Laurel, NJ (US)

( * ) Notice: Subject to any disclaimer, the term of this patent is extended or adjusted under 35 U.S.C. 154(b) by 0 days.

(21) Appl. No.: 13/076,677

(22) Filed: Mar. 31, 2011

(65) Prior Publication Data

US 2011/0246679 A1 Oct. 6, 2011

Related U.S. Application Data

(60) Provisional application No. 61/319,358, filed on Mar. 31, 2010.

(51) Int. Cl.
*G06F 3/00* (2006.01)
*G06F 15/00* (2006.01)

(52) U.S. Cl. .......................... 710/15; 358/1.14

(58) Field of Classification Search ............ 710/15
See application file for complete search history.

(56) References Cited

U.S. PATENT DOCUMENTS

| | | | |
|---|---|---|---|
| 5,323,393 A | 6/1994 | Barrett et al. | |
| 5,325,527 A | 6/1994 | Cwikowski et al. | |
| 5,764,866 A | 6/1998 | Maniwa | |
| 5,860,066 A | 1/1999 | Rouse | |
| 6,125,372 A | 9/2000 | White | |
| 6,184,996 B1 | 2/2001 | Gase | |
| 6,249,821 B1 | 6/2001 | Agatone et al. | |
| 6,388,771 B1 | 5/2002 | Tamaki | |
| 6,412,022 B1 | 6/2002 | Kumpf et al. | |
| 6,545,767 B1 | 4/2003 | Kuroyanagi | |
| 6,581,098 B1 | 6/2003 | Kumpf | |
| 6,650,794 B1 | 11/2003 | Aoki | |
| 6,665,086 B2 | 12/2003 | Hull et al. | |
| 6,748,471 B1 | 6/2004 | Keeney et al. | |
| 6,894,802 B1 | 5/2005 | Biondi et al. | |
| 6,937,354 B2 | 8/2005 | Kobayashi et al. | |
| 6,961,139 B1 | 11/2005 | Kita et al. | |
| 6,961,140 B2 | 11/2005 | Moore et al. | |
| 6,970,183 B1 | 11/2005 | Monroe | |
| 7,075,669 B2 | 7/2006 | Reddy | |
| 7,095,518 B1 | 8/2006 | Keeney et al. | |
| 7,099,023 B2 | 8/2006 | Chrisop et al. | |
| 7,127,715 B2 | 10/2006 | Inui | |
| 7,136,179 B2 | 11/2006 | Ohara | |
| 7,167,919 B2 | 1/2007 | Iwamoto et al. | |
| 7,202,962 B2 | 4/2007 | Roosen et al. | |

(Continued)

OTHER PUBLICATIONS

Oki Printing Solutions; Users Guide: Job Accounting; Copyright a 2006 by Oki Data.

(Continued)

*Primary Examiner* — Henry Tsai
*Assistant Examiner* — Titus Wong
(74) *Attorney, Agent, or Firm* — Panitch Schwarze Belisario & Nadel LLP

(57) ABSTRACT

A method for controlling the use of a plurality of peripheral devices by a user is disclosed. The method includes assigning access rights to a user for access to individual ones of the peripheral devices, and quotas to each user for the use of peripheral devices over a predetermined period. The system collects the use of each one of the peripheral devices by each user and totals the use by each user of the peripheral devices over the predetermined period. The method prevents a user from using the peripheral devices when the user exceeds the user's quota. The method also prevents a user from using peripheral devices to which the user has not been granted access rights.

18 Claims, 12 Drawing Sheets

U.S. PATENT DOCUMENTS

| | | | |
|---|---|---|---|
| 7,215,434 B1 | 5/2007 | Janse et al. | |
| 7,262,872 B2 | 8/2007 | Nakamura | |
| 7,284,061 B2 | 10/2007 | Matsubayashi et al. | |
| 7,292,355 B2 | 11/2007 | Jacobsen | |
| 7,315,824 B2 | 1/2008 | Chen et al. | |
| 7,333,224 B2 | 2/2008 | Gallacher | |
| 7,336,399 B2 | 2/2008 | Nara | |
| 7,352,865 B2 | 4/2008 | Gassho et al. | |
| 7,359,076 B2 | 4/2008 | Uchino | |
| 7,392,377 B2 | 6/2008 | Ogg et al. | |
| 7,397,362 B2 | 7/2008 | Zhang et al. | |
| 7,405,844 B2 | 7/2008 | Ferlitsch | |
| 7,415,509 B1 | 8/2008 | Kaltenmark et al. | |
| 7,421,491 B2 | 9/2008 | Tameda et al. | |
| 7,443,527 B1 | 10/2008 | Shigeeda | |
| 7,444,400 B2 | 10/2008 | Hara et al. | |
| 7,463,374 B2 | 12/2008 | Corlett et al. | |
| 7,463,380 B2 | 12/2008 | Ferlitsch | |
| 7,467,416 B2 | 12/2008 | Lapstun et al. | |
| 7,487,233 B2 | 2/2009 | Iwamoto et al. | |
| 7,546,353 B2 | 6/2009 | Hesselink et al. | |
| 7,586,635 B2 | 9/2009 | Maeda et al. | |
| 7,587,476 B2 | 9/2009 | Sato | |
| 7,588,192 B2 | 9/2009 | Bystrom et al. | |
| 7,620,177 B2 | 11/2009 | Ibrahim et al. | |
| 7,730,526 B2 | 6/2010 | Lamplough | |
| 2004/0267868 A1* | 12/2004 | Wilk | 709/200 |
| 2005/0105129 A1 | 5/2005 | Takahashi | |
| 2005/0171914 A1 | 8/2005 | Saitoh | |
| 2005/0275868 A1* | 12/2005 | Higashiura et al. | 358/1.14 |
| 2005/0288939 A1 | 12/2005 | Peled et al. | |
| 2006/0082816 A1 | 4/2006 | Daniel et al. | |
| 2006/0221375 A1 | 10/2006 | Nagarajan et al. | |
| 2006/0221405 A1 | 10/2006 | Matsumoto | |
| 2006/0282463 A1 | 12/2006 | Rudolph et al. | |
| 2007/0030511 A1 | 2/2007 | Lee | |
| 2007/0130365 A1 | 6/2007 | Rebert et al. | |
| 2008/0043274 A1 | 2/2008 | Wang et al. | |
| 2008/0055627 A1 | 3/2008 | Ellis | |
| 2008/0079985 A1 | 4/2008 | Ferlitsch | |
| 2008/0184251 A1* | 7/2008 | Shahindoust et al. | 718/104 |
| 2008/0225325 A1 | 9/2008 | Chen et al. | |
| 2008/0231889 A1 | 9/2008 | Morohoshi | |
| 2008/0273224 A1* | 11/2008 | Maulsby et al. | 358/1.15 |
| 2008/0297829 A1 | 12/2008 | Paek | |
| 2009/0009802 A1 | 1/2009 | Shaw et al. | |
| 2009/0015862 A1 | 1/2009 | Kim | |
| 2009/0033976 A1 | 2/2009 | Ding | |
| 2009/0046311 A1 | 2/2009 | Asai | |
| 2009/0063860 A1 | 3/2009 | Barnett et al. | |
| 2009/0097068 A1 | 4/2009 | Ball | |
| 2009/0119280 A1 | 5/2009 | Waters et al. | |
| 2009/0207438 A1 | 8/2009 | Fujita | |
| 2009/0207440 A1 | 8/2009 | Kaneko et al. | |
| 2009/0222534 A1 | 9/2009 | Kitada | |
| 2009/0235341 A1 | 9/2009 | Hashimoto | |
| 2009/0240581 A1 | 9/2009 | Gallo et al. | |
| 2009/0271872 A1 | 10/2009 | Ishizuka et al. | |
| 2010/0007907 A1 | 1/2010 | Aikens et al. | |
| 2010/0054467 A1 | 3/2010 | Cho | |
| 2010/0141983 A1 | 6/2010 | Sorrentino et al. | |
| 2011/0090528 A1* | 4/2011 | Harrington et al. | 358/1.15 |

OTHER PUBLICATIONS

Buyers Lab Solutions Report: Equitrac Professional 5.2.2; A BLI Network Device Management Software Assessment; Aug. 2008.

\* cited by examiner

DISTRIBUTED PERIPHERAL DEVICE MANAGEMENT SYSTEM

CROSS-REFERENCE TO RELATED APPLICATIONS

This application claims the benefit of U.S. Provisional Application No. 61/319,358, filed Mar. 31, 2010, the contents of which are incorporated herein by reference in their entirety.

BACKGROUND OF THE INVENTION

1. Field of the Invention

This application is directed to a system for the management of peripheral devices and more particularly to a system for monitoring and controlling the use of printers and multifunctional printing devices (MFP) distributed throughout a computer network.

2. Background

Currently, there are deployed enterprise computer systems that include as many as tens of thousands of users, deployed in thousands of locations and having at the user's disposal, tens of thousands of peripheral devices. The peripheral devices deployed in these computer systems are generally of variety of manufacture and have a variety of functional capabilities. Many of the devices are multifunctional printing devices (MFP) capable of printing, scanning, copying and facsimile, and capable of operating with a wide variety of selectable services, i.e. color printing, mono printing, variable resolution etc.

The cost to an enterprise for supporting a large number of peripheral devices is significant in terms of paper usage, toner usage and maintenance of the devices. Consequently, there is a need to both monitor and control the use of such peripheral devices in order to ensure that the use of the devices is authorized and justified.

One approach for controlling the costs associated with the use of peripheral devices is to monitor the use of the peripheral devises on a per user basis and/or restrict access to specified peripheral devices and/or device services on a per user basis. However, in the state of the art, such systems that provide for system-wide monitoring and controlling the use of a large number of peripheral devices on a per user basis are typically limited to the peripheral devices of a single manufacturer and/or are costly in terms of both initial costs and maintenance costs.

Accordingly, there is a need for a peripheral device monitoring and control system that can: (1) provide the ability to monitor and control the usage of the totality of the peripheral devices arranged on a widely distributed computer network by individual users, (2) be configured on existing enterprise computer systems without a large expense for additional equipment, (3) retrieve use data from peripheral devices of different types from a variety of manufacturers using only the embedded features of the peripheral devices, and (4) be easily configured and maintained.

BRIEF SUMMARY OF THE INVENTION

Briefly stated, an aspect of the present invention is a method for controlling by a manager server, the use by a user of a peripheral device, said peripheral device being one of a plurality of peripheral devices which are directly connected to the manager server via a network or are connected to the manager server via a workstation which is connected to the manager server via the network, the method comprising the steps of: periodically receiving in the manager server, accounting data specific to the user from each one of the peripheral devices for which the user has access rights, said manager server totaling the accounting data received from the peripheral devices to determine a usage by the user of the peripheral devices for the predetermined period of time; storing in the manager server, account information specific to the user, the account information including a quota for the user to use the peripheral device and/or one or more services of the peripheral device for the predetermined period, the usage of the user for the predetermined period, and/or permissions to use one or more of the services of the peripheral device; and periodically receiving in the workstation at which the user has logged-in, the account information specific to the user; wherein if the account information received by the workstation indicates that the user's usage exceeds the user's quota at the time that the user's account information is received by the workstation, print queues of the workstation at which the user has logged-in are paused for the balance of the predetermined period and/or any pending jobs in the print queue are deleted from the print queue.

Another aspect of the invention is a method for controlling by a manager server, the use of a plurality of peripheral devices by a user logged-in at a workstation, said workstation including one or more print queues, said manager server, workstation and peripheral devices being operatively connected on a network, the method comprising the steps of: storing in the manager server, account information specific to the user, the account information including an account identifier and permissions for the user to use one or more of the services of the peripheral devices; periodically transmitting the user's account information from the manager server to each of the peripheral devices to which the user has been granted access rights; and configuring each print queue included in the workstation with the user's account identifier such that each job initiated by the user to one or more of the plurality of peripheral devices includes the account identifier; wherein, when a job initiated by the user from the workstation is received by one or more of the peripheral devices, each respective peripheral device compares the account identifier included in the job with the user's account information stored in the respective peripheral device, and if the account information associated with the account identifier provides for access to the respective peripheral device and for the requested service, the job is performed by the respective peripheral device.

Another aspect of the invention is a workstation for use by a user to transmit a job to a peripheral device, said peripheral device being one of a plurality of peripheral devices, the workstation comprising: one or more print queues configured to temporarily store one or more jobs destined to be transmitted to the peripheral device; and an agent configured to receive a quota for the user to use the plurality of peripheral devices during a predetermined period, and a usage of the user indicating the use by the user of the peripheral devices in the predetermined period, wherein if the usage of the user exceeds the quota of the user, the agent notifies the user that the quota is exceeded and/or prevents the one or more jobs stored in the print queues from being transmitted.

A further aspect of the invention is a method for configuring a printer queue in a workstation with an account identifier and/or a print identifier. The method includes the steps of: installing an agent in the workstation, said agent; receiving the account identifier and/or a print identifier from a manager server; interfacing with an operating system of the workstation to unlock a resource required for configuring the printer queue; using the resource to configure the printer queue with the account identifier and/or the print identifier; and thereafter locking the resource.

Another aspect of the invention is a method for controlling by a manager server, the use of a peripheral device by a user logged-in at one of a plurality of workstations connected to the manager server via a network, each workstation including one or more print queues, said peripheral device being one of a plurality of peripheral devices which are directly connected to the manager server via the network, or are connected to the manager server via the workstation at which the user has logged-in, the method comprising the steps of: periodically receiving in the manager server, accounting data specific to the user from each one of the peripheral devices for which the user has access rights, and accounting data received from each workstation at which the user has logged-in, said manager server totaling the accounting data from the peripheral devices and each workstation at which the user has logged-in are totaled over a predetermined period of time to determine a usage by the user of the peripheral devices for the predetermined period of time; storing in the manager server, account information specific to the user, the account information including an account identifier, a quota for the user to use the peripheral device and/or one or more services of the peripheral device for the predetermined period, the usage of the user for the predetermined period, and/or permissions to use one or more of the services of the peripheral device; periodically transmitting the user's account information from the manager server to the workstation at which the user has logged-in and to each of the peripheral devices to which the user has been granted access rights; and configuring each print queue included in the workstation with the user's account identifier at the time that the user logs in at the workstation, such that each job initiated by the user to one or more of the plurality of peripheral devices includes the account identifier;

wherein if the account information received by the workstation indicates that the user's usage exceeds the user's quota at the time that the user's account information is received by the workstation, the print queues of the workstation at which the user has logged-in are paused for the balance of the predetermined period and/or any pending jobs in the print queues are deleted from the print queues, and if the user's quota is not exceeded, the account identifier in each job initiated by the user from the workstation and received by the one or more of the peripheral devices is compared with the account identifiers stored in each respective peripheral device, and if the account information associated with the account identifier provides for access to the respective peripheral device and for the requested service, the job is performed by the respective peripheral device.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

As used in the description of the invention and the appended claims, the singular forms "a", "an" and "the" are intended to include the plural forms as well, unless the context clearly indicates otherwise. The word "or", as used herein refers to an alternative to the associated items, that is one or the other, but not both. The words "and/or" as used herein refers to and encompasses any and all possible combinations of one or more of the associated listed items. The words "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the words "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The present invention is a peripheral device management system which is operative on a computer network for controlling access by individual users to a variety of diverse peripheral devices attached to the network, and for monitoring and controlling the use of specific functions of the peripheral devices by the individual users. The function of controlling and monitoring the use of the peripheral devices by individual users is referred generally herein as accounting. The peripheral devices for which the use thereof is monitored and/or controlled on a per user basis are referred to herein as managed peripheral devices.

Figure 1:
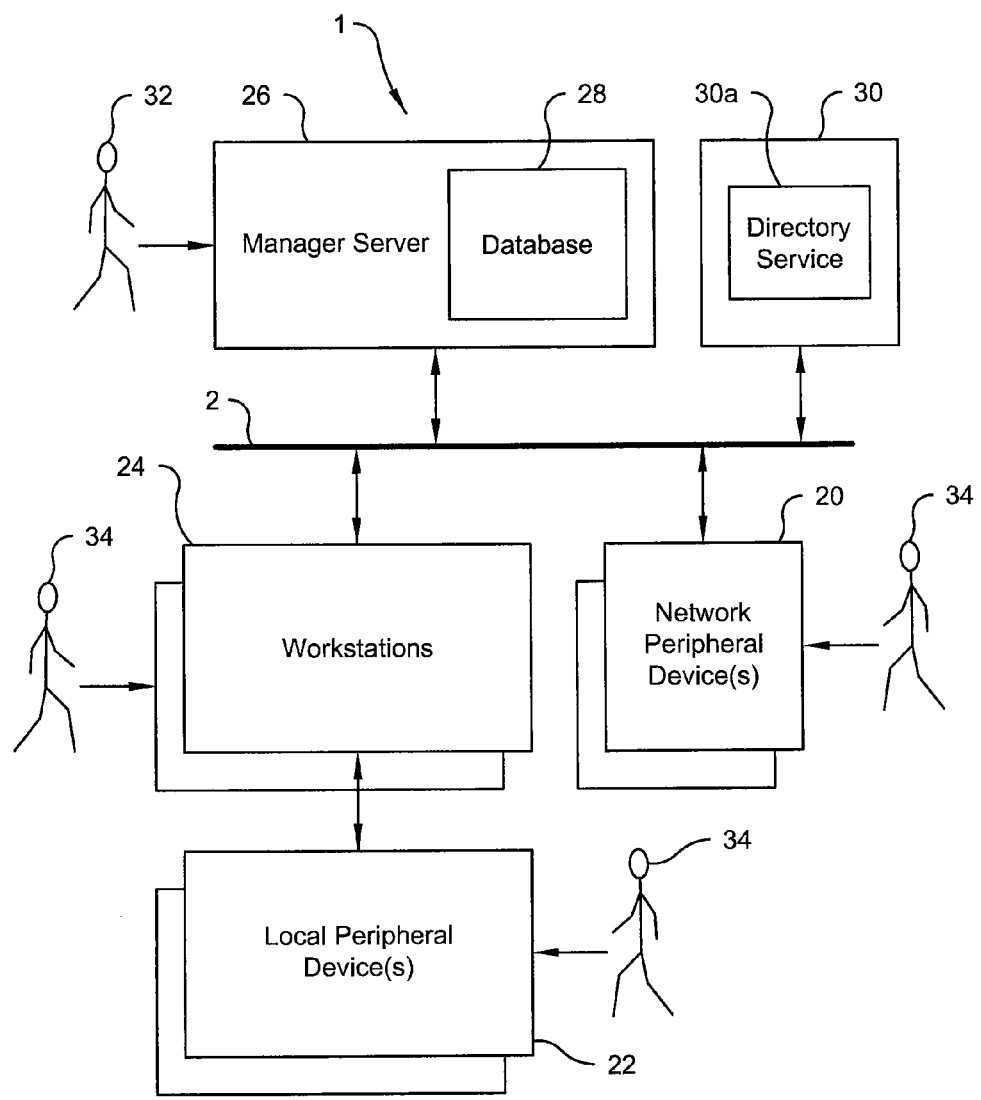
FIG. 1 is a functional block diagram of a preferred embodiment of a peripheral device management system in accordance with the present invention.

Referring now to FIG. 1 there is shown a functional block diagram of a distributed peripheral device management system 1 (hereafter "system") according to a preferred embodiment of the invention. The system 1 includes a manager server 26, a directory server 30 which includes a directory service 30a, one or more workstations 24, and one or more managed network peripheral devices 20 (hereafter network devices 20) connected to the manager server 26 by a TCP/IP network 2; and one or more managed local peripheral devices 22 (hereafter local devices 22), directly connected to a respective workstation 24, preferably by a universal serial bus, and connected to the manager server 26 via the respective workstation 24. The computer network 2 may comprise a local area network (LAN), a wide area network (WAN), the Internet a combination of the foregoing or some other network. Users of the network devices 20 and the local devices 22 are referred to as directory users 34, i.e. users that are subject to accounting. Administrator users 32, are users that have administrative rights and are not subject to accounting. There may be users and peripheral devices operative on the computer network 2 which are not managed by the system 1.

Preferably, the manager server 26 is a commercially available server computer. Preferably, the manager server 26 includes a processor and memory, a graphical user interface based operating system such as Microsoft Windows, a display device and means such as a mouse and/or a keyboard (not shown) for an administrator user 32 to manipulate objects displayed on the screen of the display device and for the administrator user 32 to enter data into the manager server 26. Each manager server 26 further includes a network interface controller (not shown) for connecting the manager server 26 to the computer network 2 using, for example, Ethernet protocol and one or more interface controllers (not shown) for interfacing to non-network devices. The manager server 26 also preferably includes a Web browser and a Web server (not shown).

Preferably, the manager server 26 also includes, or has access to, a database 28. Such database 28 is preferably a relational database using a structured query language (SQL), but other types of databases may be used. Preferably the database 28 stores account information 64 about each directory user 34, device properties data 66 such as manufacturer name, model, serial etc. about each network device 20 and local device 22 connected to the system 1, accounting data 62 about the use of the network devices 20 and local devices 22 by individual directory users 34 of the system 1, and access rights for the directory users 34 to the network devices 20 and local devices 22. The account information 64 for a directory user 34 and the accounting data 62 for a directory user 34, taken together, constitute a user account.

As discussed below, the nature of the accounting features embedded in the network devices 20 and the local devices 22 can be can be very diverse even though the external behavior may appear similar. In order to store and retrieve the account information 64 and retrieve accounting data 62 from each of the diverse types of network devices 20, the manager server 26 includes modular program code, which executes in the processor and memory, for communicating with the network devices 20. In particular, in the preferred embodiment, the manager server 26, using the address of each network device 20 to retrieve the type of the network devices 20, automatically determines what module of the program code to use for storing and retrieving account information 64 and for retrieving accounting data 62. Depending on the type of the network device 20, the server 26 may utilize SNMP, PJL over TCP port 9100, and HTTP/HTML using Web server 70, as appropriate. By virtue of the manager server including automatically selectable modules of the program code, the manager server 26 is capable of issuing commands, appropriate to the type of network device 20 to each type of network device 20 which can: (1) read the list of accounts stored in each network device 20 and local device 22, (2) read the configuration of an account stored in each network device 20 and local device 22, (3) configure an account in each network device 20 and local device 22, (4) remove an account from each network device 20 and local device 22 and (5) collect account data 62.

Preferably, the manager server 26 is capable of interoperating with and exchanging account information 64 with other manager servers including a central manager server (not shown) which aggregates data from a plurality of the manager servers 26.

Preferably, the account information 64 includes, for each directory user 34, the directory user's 34 personal name, username, a unique account identifier assigned to the directory user 34 by the system 1, a unique print identifier assigned by the system 1 where secure printing is enabled, e-mail address(es), and user group membership(s). Preferably, the account information 64 for a directory user 34 also includes, for example, quotas for a directory user 34 to use specific services of a network device 20 or local device 22 such as a color printing quota, a mono printing quotas over a predetermined period of time, permission to use specific services of the network devices 20 and local devices 22 such as printing, copying, scanning, and faxing, and the user's usage of the local devices 22 and network devices 20 over the predetermined period. The quota(s) may be used to limit the amount of use for a particular function of the network devices 20 and local devices 22 by a directory user 34 in a predetermined time period or may merely be used as a threshold to notify the directory user 34, an administrator 34 or another person when the quota is exceeded in the predetermined period. However, the account information 64 need not include quotas if the system 1 provides only for restricting access to specified network devices 20 and local devices 22, and does not provide for enforcing quotas.

In the preferred embodiment of the system 1, the username of the directory user 34 is associated with and has the same meaning and function as a Windows username.

The account identifier is created for each directory user 34 by the administrator 32. The account identifier is used by the system 1 to control access by a directory user 34 to the functions of the network devices 20 and local devices 22. The account identifier is unique to each directory user 34 and is distinct from the directory user's 34 username. Preferably, the account identifier is a number, but could be an alphanumeric or other sequence.

The print identifier is a secure print feature, sometimes referred to as a secure print number (PIN) or secure print PIN, whereby a print job is not performed by a network device 20 or local device 22 until the print identifier is manually entered into the network device 20 or local device 22 by a directory user 34 when the directory user 34 is in proximity to the network device 20 or local device 22. The print identifier is a unique identifier assigned to each directory user 34 by the administrator 32. Preferably, the print identifier is a number but could be an alphanumeric or other sequence and optionally could be made the same as the account identifier.

Preferably, the account information 64 for each directory user 34 is initially entered into the active directory server 30 and is obtained by the manager server 26 from the active directory server 30 and stored by the manager server 26 in the database 28. However, the initial account information 64 may also be entered into the database 28 from another external service in the form of, for example a comma separated value (CSV) file or extended markup language (XML) file, or from a lightweight direct access protocol (LDAP) server, a Web service or a third party database. Alternatively, the account information 64 may be entered into the manager server 26 by an administrator user 32 at a console of the manager server 26 or via a Web server of the manager server 26.

Accounting data 62 includes: (1) data which is recorded in the network devices 20 and local devices 22 about the use of the network devices 20 and local devices 22 by each directory user 34 using the network device 20 or local device 22, and (2) data stored in each workstation 24 for each directory user 34 having logged-into the workstation 24. Depending on the type of accounting supported by the network devices 20 and local devices 22, accounting data 62 stored in the database 28 may be in the form of job logs retrieved by the manager server 26 from each network device 20 and local device 22 including the name of directory user 34, date/time, number of color pages printed and the number of mono pages printed etc. Alternatively, accounting data 62 stored in the database 28 may be totals of counters, such as color and mono page counters, retrieved by the manager server 28 from each network device 20 and local device 22 for each directory user 34 using the network device 20 or local device 22, for a defined period. Some local devices 22 and network devices 20 may not store accounting data 62.

The accounting data 62 retrieved from the workstations may include data about the print queues 37 and/or the print log 35.

Preferably, the manager server 26 periodically totals the use by each directory user 34 of specific services of each network device 20 and local device 22 by evaluating the accounting data 62 to determine a usage of the specific services of each of the network devices 20 and local devices 22 by each respective directory user 34 over a predetermined period. The manager server 26 further compares the usage of each directory user 34 with the quota assigned to each respective directory user 34. The manager server 26 may determine usage by favoring accounting data 62 received from the local devices 22 and the network devices 20 or from the workstations 24 based on quality of the respective data. If the result of the comparison shows that a directory user 34 has exceeded the user's assigned quota, the account information in the workstations 24, network devices 20 and local devices 22 is updated to deny the directory user 34 access to the network devices 20 and local devices 22 at the time the account information 64 stored in the manger server 26 is synchronized with the workstations 24 and the network devices 20 and local devices 22.

Preferably, the system 1 includes a directory service 30*a* installed on the directory server 30. The directory service 30*a* provides authentication services for directory users 34 accessing the system 1 via a workstation 24 and the administrator users 32 accessing the manager server 28. Preferably, the directory service 30*a* is implemented with Microsoft Active Directory but could be implemented by other products such as Novell eDirectory.

Preferably, in addition to providing authentication, the directory service 30*a* is the principal resource for entering and storing information about the directory users 34 and the administrator users 32 of the system 1. Preferably, the information about the directory users 34 includes for each directory user 34, the user's username, password, e-mail address, account identifier, print identifier, user group membership(s), color printing quota, mono printing quota and possibly other data. While it is preferred that a directory service 30*a* be used as the means for authentication services and for entering and storing user information into the system 1, it is not required for the system 1 to use a directory service 30*a*, since authentication could be performed within each workstation 24 and network device 20 and local device 22, and the user information could be entered directly into the manager server 26 by other means, as described below.

Preferably, the account information 64 stored in the database 28 is periodically synchronized with the account information 64 in the directory service 30*a* in order to maintain the account information 64 in the database 28 current. Preferably, synchronization is performed once a day but could be more or less often than once a day, or could be performed by command of an administrator user 32.

Figure 2:
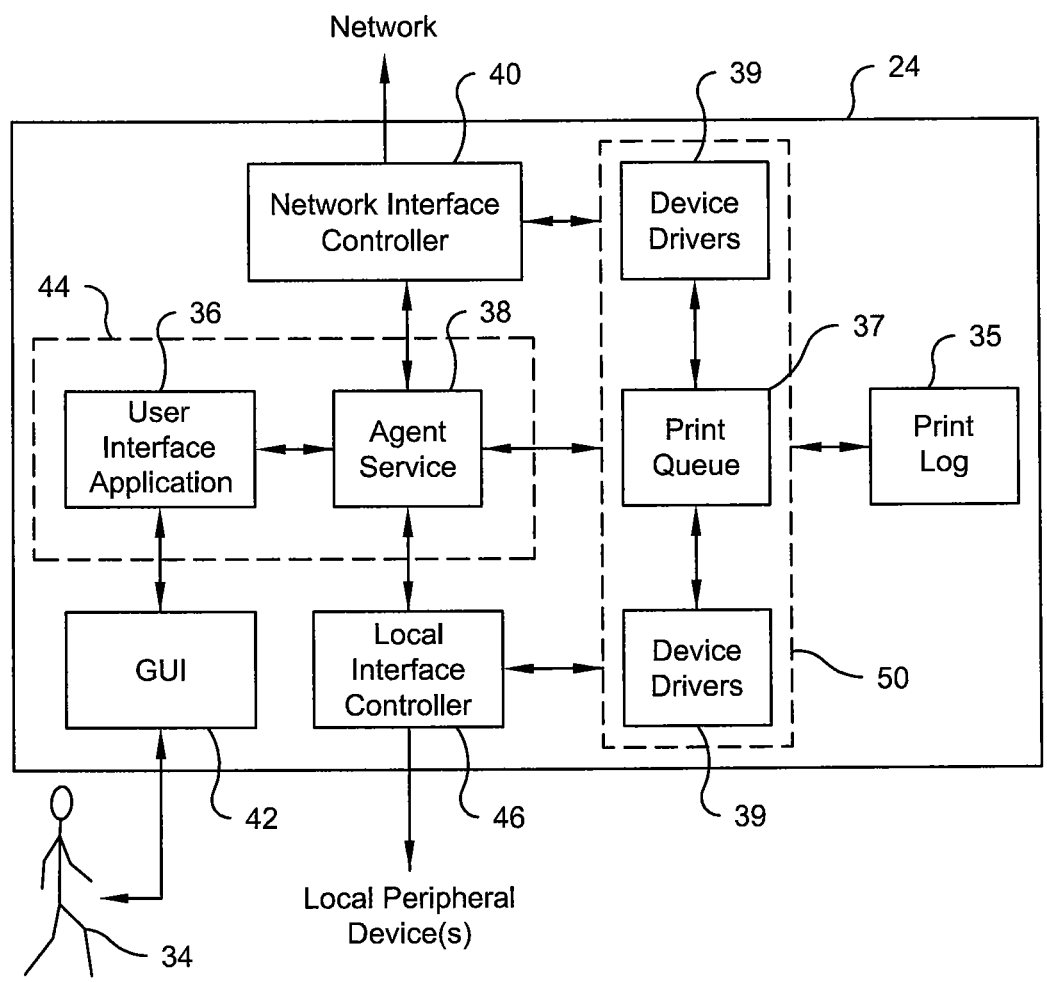
FIG. 2 is a functional block diagram of a workstation in accordance with the preferred embodiment.

Preferably each workstation 24 is a conventional type of computer known as a personal computer, including a central processing unit, memory of various types, and a graphical user interface (GUI) based operating system such as Microsoft Windows or MAC OS (none of which are shown). Also, as shown in the functional block diagram of FIG. 2, each workstation 24 also includes a GUI/graphics display device 42 and means, such as a mouse and a keyboard (not shown), for a directory user 34 to manipulate objects displayed on the screen of the display device 42 and to enter data into the workstation 24. Each workstation 24 also includes one or more local interface controllers 46 for supporting locally connected devices 22, and a network interface controller 40 for connecting the workstation 24 to the computer network 2 using for example Ethernet protocols. Preferably, the local interface controller 46 is a universal serial bus (USB) host but could also be a point-to point serial or parallel controller.

Each workstation 24, also includes a print log 35, a printer queue 50, and a workstation agent 44.

Preferably, the print log 35 logs for each job originating on the workstation 24, the date/time of the job, the name of the user initiating the job, the number of pages associated with the job, whether, if the job is a print job, the print job is color or mono, the job title and the port used by the workstation 24 for transmitting the job.

In the preferred embodiment, the printer queue 50 includes a device driver 39 for each network device 20 and local device 22 model to be used for jobs originating from the workstation 24, and a designation of the port in the workstation 24 for providing connectivity from the workstation 24 to the network devices 20 and local devices 22 to be used for performing a job. The printer queue 50 also includes one or more print queues 37. Each print queue 37 connects one or more print drivers to a print port in the workstation 24.

The workstation agent 44 includes an agent service 38 and a user interface application 36. The agent service 38 provides means for the workstation 24 to send and receive information to/from the manager server 26, to send information to the workstation display device 42, to receive information from the user's keyboard (not shown) via the user interface application 36, and to send and receive data to/from a local device 22. As further described below, the agent service 38 retrieves device property data 66, accounting data 62 including page counters, and account information 64 from the local device 22 and transmits the device property data 66, accounting data 62 and the account information 64 to the manager server 26.

The agent service 38 also receives the account identifier, the print identifier, quotas and current usage for a logged-in directory user 34 from the manager server 26 and stores the account identifier, the print identifier, quotas and current usage for the directory user 34 in the memory of the workstation 24. The agent service 38 by virtue of having system access rights in the operating system, provides access to software resources in the workstation 24 required for configuring the print queues 37 with the account identifier and print identifier of the logged-in directory user 34 received from the manager server 26, and for pausing or deleting jobs temporarily stored in the print queues 37 when the usage by the directory user 34 logged-in at the workstation 34 exceeds the quota for a service of the network 20 or local peripheral devices 22 is exceeded.

Preferably, the agent service 38 establishes communication with the manager server 26 upon the directory user 34 logging into the workstation 24 and periodically thereafter.

The user interface application 36 is interposed between the GUI/display device 42 and the agent service 38. In conjunction with the agent service 38, the user interface application 36 provides means for displaying messages received from the agent service 38 on the desktop of the workstation 34, and for receiving input from a directory user 34 relevant to configuring the workstation printer queue 50.

Preferably, each local device 22 and each network device 20 has a service for receiving and printing a job on a medium. In addition, one or more of the network devices 20 and local devices 22 may provide a service for copying, a service for scanning and a service for facsimile transmission of a job. Such devices which are capable of multiple services are referred to herein as multifunctional peripheral devices (MFP). The data associated with printing, copying, scanning or facsimile of a single action by a user 34 is referred to herein as a "job", i.e. a print job, a copy job, a scan job and a facsimile job.

Figure 3:
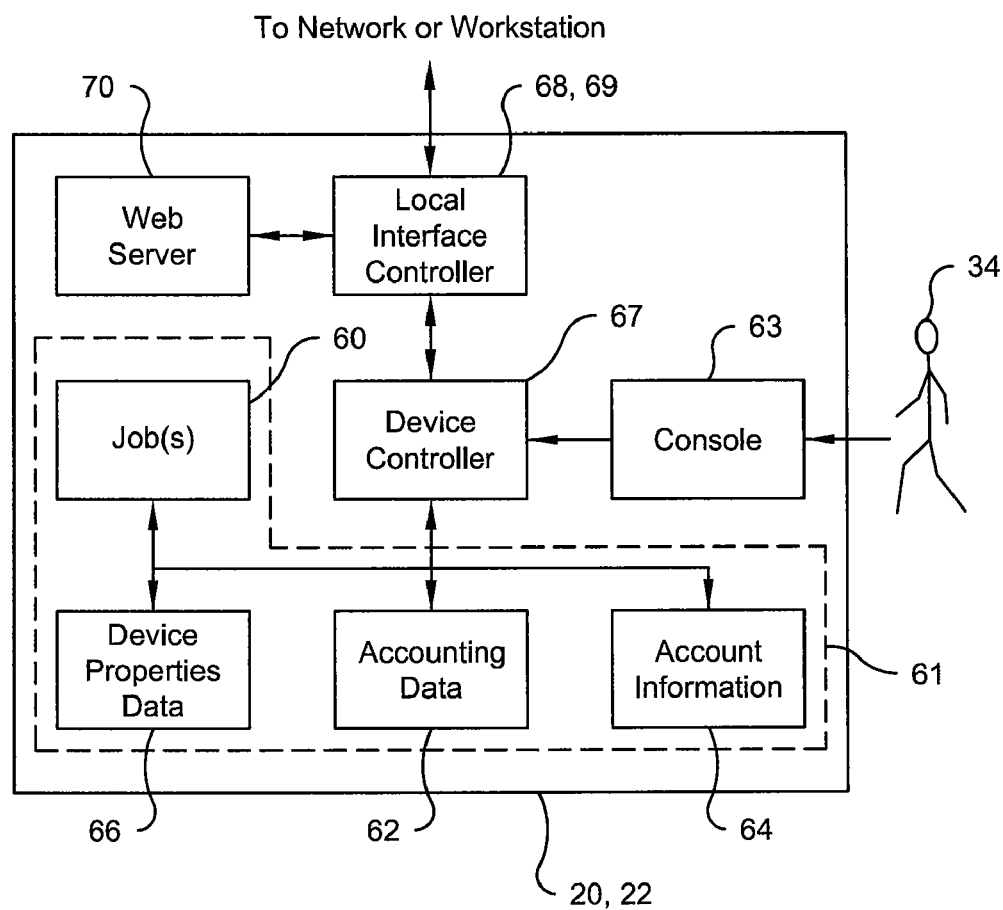
FIG. 3 is a functional block diagram of a peripheral device in accordance with the preferred embodiment.

As shown in FIG. 3, each local and each network device 20, 22 includes a device controller 67 which provides for storing and retrieving in and from a memory 61, temporarily stored jobs 60, device properties data 66, account information 64 for each of the directory users 34 with access rights to the network device 20 or local device 22. Each local device 22 and network device 20, includes accounting data 62, and depending on the type of the local device 22 and the network device 20, includes current usage counters for printed color, printed mono, scan and copy per user and/or a log of print/scan/copy/fax jobs with job title, user account identifier, date, time, counts etc.

Each local device 22 also includes a local interface controller 68 for communicating with a workstation 24. Each network device 20 includes a network interface controller 69 for connecting the network device 20 to the computer network 2. Preferably the local interface controller 68 is a USB host and the network interface controller 69 is an Ethernet controller. Each network device 20 and local device 22 also includes an operator console 63 including, for example, an input device such as a keyboard or touch screen, and a display which provides a directory user 34 with the capability of directly monitoring and controlling the operation of the network device 20 or local device 22 and receiving information about the operating mode and status of the network device 20 or local device 22. While the local interface controller 68 and the network interface controller 69 are shown separately from the device controller 67 in FIG. 3, the local interface controller 68 and the network interface controller 69 may be integral with the device controller 67.

As described above, the system 1 is configured to control and monitor local devices 22 and network devices 20 based on the embedded features of the local devices 22 and the network devices 20. Consequently, in the preferred embodiment, the commands between the manager server 26 and the network device 20 or local device 22 for storing account information 64 and retrieving accounting data 62 and device property data 66 are matched to the type of local device 22 and network device 20 and are performed using standard protocols customized to the type of the local device 22, and the network device 22, such as SNMP, PJL over TCP port 9100, and HTTP/HTML using Web server 70, as appropriate to the type of data and the manufacturer and specific model of the network device 20 or local device 22.

Preferably, the operating mode of the each network device 20 and local device 22 is capable of being selected by a command originating from a workstation 24 or from the operator console 63 of the network device 20 or local device 22. In addition, each mode may include multiple options selectable by a command from the workstation 24 or from the console 63 of the network device 20 or local device 22. For example, the one or more of the modes of printing, scanning, copying and facsimile may be selected to execute a job, for example, in color, in mono, in gray scale, with a prescribed resolution etc. depending on the capabilities of the specific network device 20 or local device 22 and the restrictions placed on the directory user 34 as discussed below.

Assigning Access Rights to Directory Users

Preferably, as described in detail below, the account information 64 for each directory user 34 which is stored in the manager server 26 is transmitted to and stored in the memory 61 of each network device 20 and each local device 22 for which the directory user 34 has access rights. The account information 64 is stored in each network device 20 or local device 22 until it is updated with current account information 64 transmitted subsequently from the manager server 26. The update of the account information 64 in each network device 20 or local device 22 by the server 26 may be performed periodically or on command of the administrator user 32.

Figure 4:
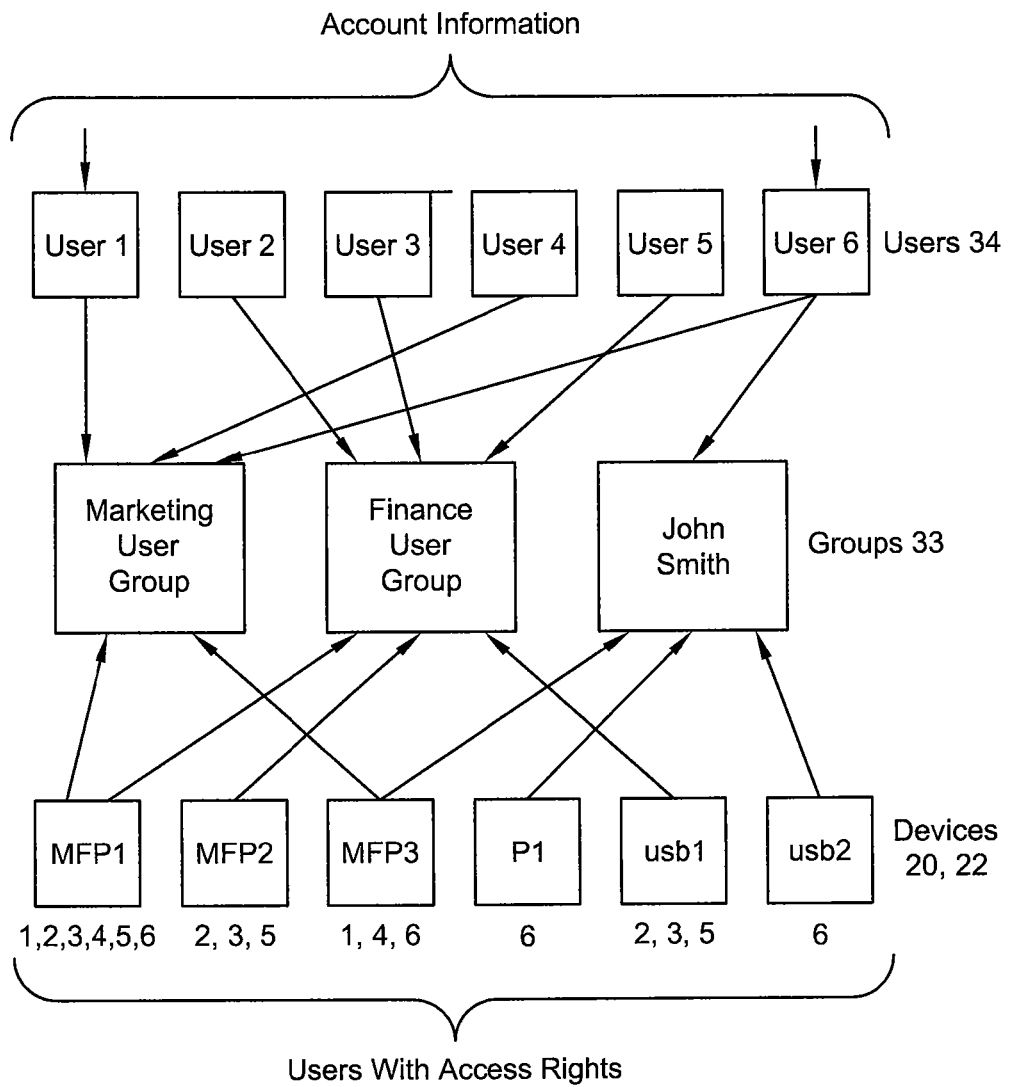
FIG. 4 is a diagram illustrating a preferred method for assigning access rights in accordance with the preferred embodiment.

The database 28 maintains a list of network devices 20 and local devices 22 for which each directory user 34 has access rights. As shown in FIG. 4, a preferred way for assigning access rights to specific network devices 20 and local devices 22 to specific ones of the directory users 34 is by assigning each of the directory users 34 receiving the access rights to one or more user groups 33, and assigning the network devices 20 and local devices 22 to which the directory users 34 are to have access, to the user groups 33. Preferably, by default, each directory user 34 has access to the local device 22 connected to the workstation 24 at which the user logs in. Preferably, the assignment of directory users 34 to user groups 33 and devices 20, 22 to user groups 33 is entered at the directory server 30 and electronically transmitted from the directory server 30 to the manager server 26 for storing in the database 28. However, the assignment of directory users 34 to user groups 33 and network devices 20 and local devices 22 to user groups 33 may be performed by an administrator user 32 directly at the manager server 26 or may be electronically received at the manager server 26 from other manager servers. While it is preferred that directory user 34 access rights are assigned by way of group assignment, directory user 34 access rights may be assigned by any other suitable means including assigning individual directory users 34 to specific network devices 20 or local devices 22. Also individual directory users 34 or groups of directory users 34 may be expressly excluded from access to individual network devices 20 and local peripheral devices 22 or groups of network devices 20 and local devices 22.

In the case of network devices 20, the manager server 26 transmits the user account information 64 directly to the network device 20 over the network using SNMP, PJL over TCP port 9100, media transfer protocol and HTTP/HTML to the peripheral device web server 70 as appropriate to the manufacturer and specific model of the network device 20. In the case of USB connected peripheral devices 22, communication with the local device 22 is via the agent service 38.

Configuring the Peripheral Devices

In the preferred embodiment, the account information 64, the accounting data 62 and the device properties data 66 stored in each network device 20 and local device 22 and in the database 28 are conformed at scheduled intervals, or optionally, the process of conforming may be initiated by the administrator 32. Preferably, the steps for conforming the account information 64 and the accounting data 62 in each network device 20 and each local devices 22 with the database 28 are performed sequentially for each network device 20 and local device 22, but simultaneously with other ones of the network devices 20 and local devices 22.

Figure 5A:
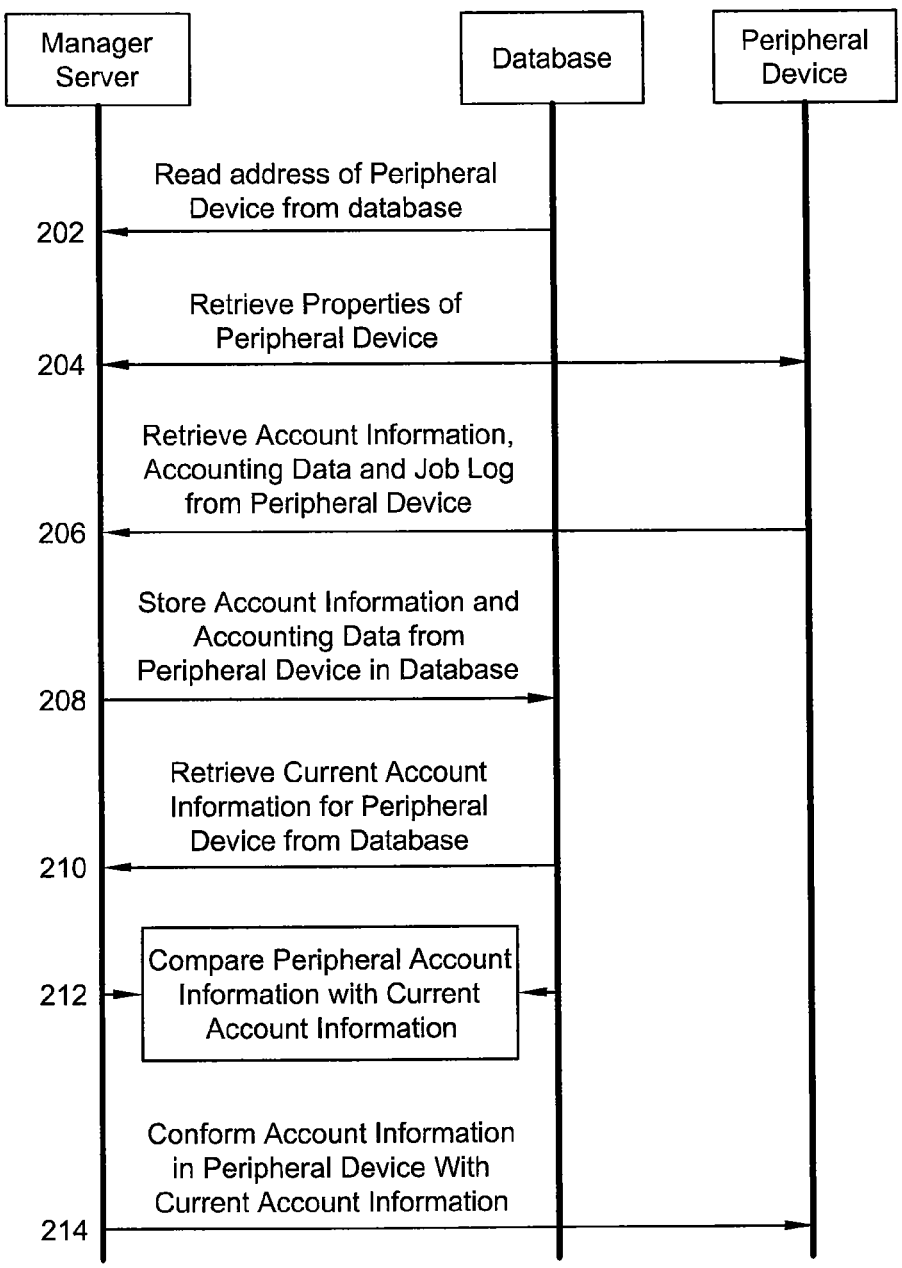
FIGS. 5A and 5B are diagrams which depict a process for configuring a peripheral device in accordance with the preferred embodiment.

A preferred process for retrieving device properties data 66 and accounting data 62 and updating the account information 64 in each network device 20 is shown in FIG. 5A. Preferably, the process shown in FIG. 5A is performed periodically, as scheduled in the manager server 26, for each individual network device 20. At step 202 the manager server 26 reads the address of a network device 20 from the database 28. At step 204 the manager server 26 retrieves the device properties data 66 from the network peripheral device 20 and compares the device properties data 66 from the network device 20 with the device properties data 66 stored in the database 28 to verify that it is the correct network device 20. New device properties data 66 are saved in the database 28. At step 206, the manager server 26 retrieves the account information 64, and the accounting data 62 including job log data from the network device 20. At step 208, the device properties data 66 and the accounting data 62 received from the network device 20 are saved in the database 28. At step 210, the manager server 26 retrieves current account information 64 for each user 34 having access rights to the peripheral device 20 from the database 28. At step 212, the account information 64 retrieved from the network device 20 is compared with the current account information 64 retrieved from the database 28. At step 214, the account information 64 in the network device 20 is conformed to the current account information 64 in the manager server 26 by transmitting from the manager server 26 to the network device 20 only changes between the account information 64 retrieved from the peripheral device 20 and the current account information 64 retrieved from the database 28.

Figure 5B:
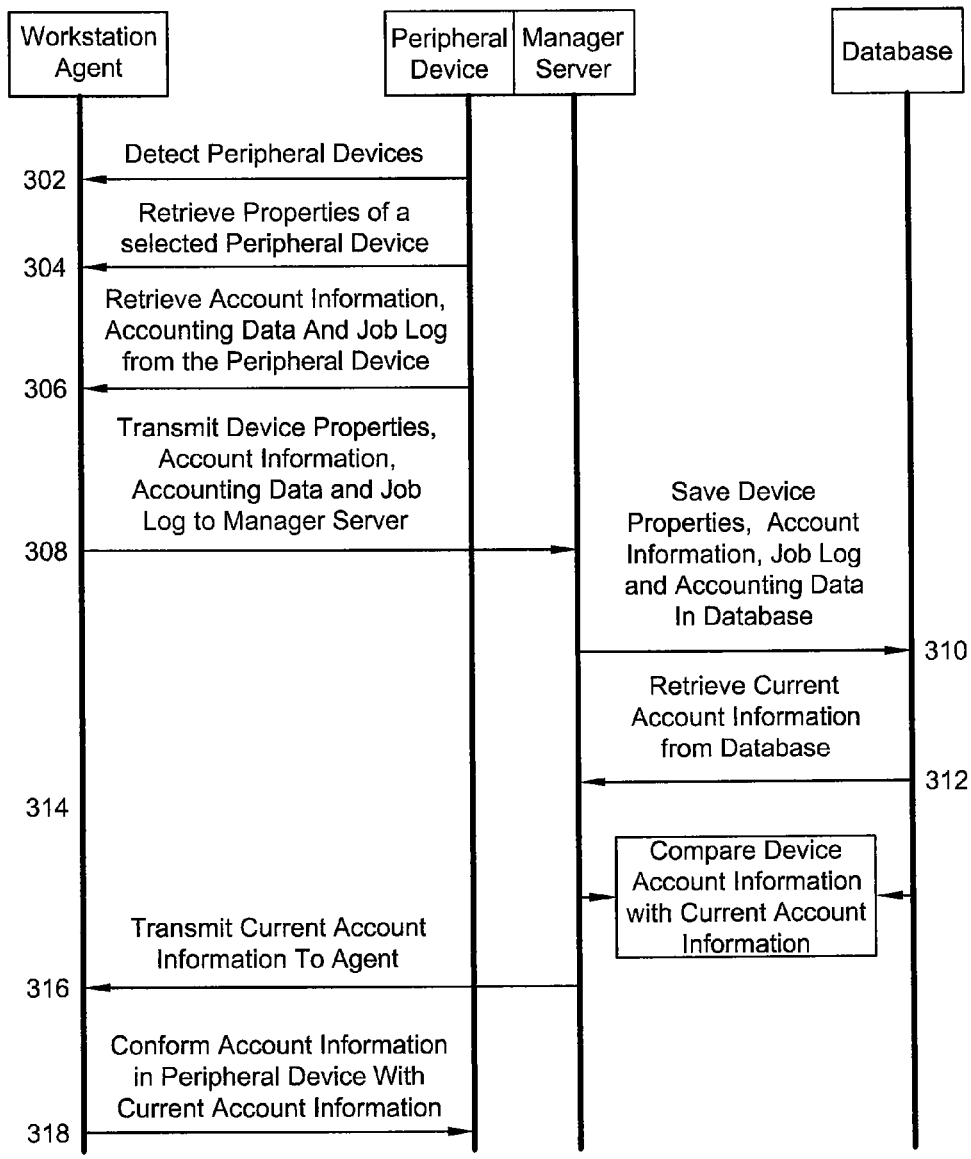

A preferred process for periodically retrieving device properties data 66 and accounting data 62 and updating the account information 64 in each local peripheral device 22 is shown in FIG. 5B. At step 302 the agent service 38 of a workstation 24 detects the local devices 22 that are locally connected to the workstation 24. Preferably, the local devices 22 are detected by inspecting the configuration of the printer queue 50 in the workstation 24 to find the addresses or ports of the local devices 22. Preferably, upon detecting the local devices 22 of a workstation 24, the agent service 38 sequentially performs steps 304 through 318 for each detected local peripheral device 22. Accordingly, at step 304 the agent service 38 retrieves the device properties data 66 from a selected one of the detected local devices 22. At step 306 the agent service 38 retrieves account information 64 and accounting data 62 and the device properties data 66 from the selected local device 22. At step 308, the agent service 38 transmits the device properties data 66, the account information 64 and the accounting data 62 retrieved from the local device 22 to the manager server 26. At step 310, the manager server 26 stores the device properties data 66, account information 64 and accounting data 62 received from the agent service 38 in the database 28. At step 312, the current account information 64 for the local device 22 is retrieved from the database 28. At step 314, the account information 64 for the local peripheral device 22 is compared with the current account information 64 stored in the database 28 for the respective local device 22. At step 316, changes in the current account information 64 are transmitted by the manager server 26 to the agent service 38. At step 318, the account information 64 in the local peripheral device 22 is conformed to the current account information 64 in the manager server 26 by the agent service 38 transmitting the changed account information 64 to the local device 22.

Configuring a Workstation

Figure 6A:
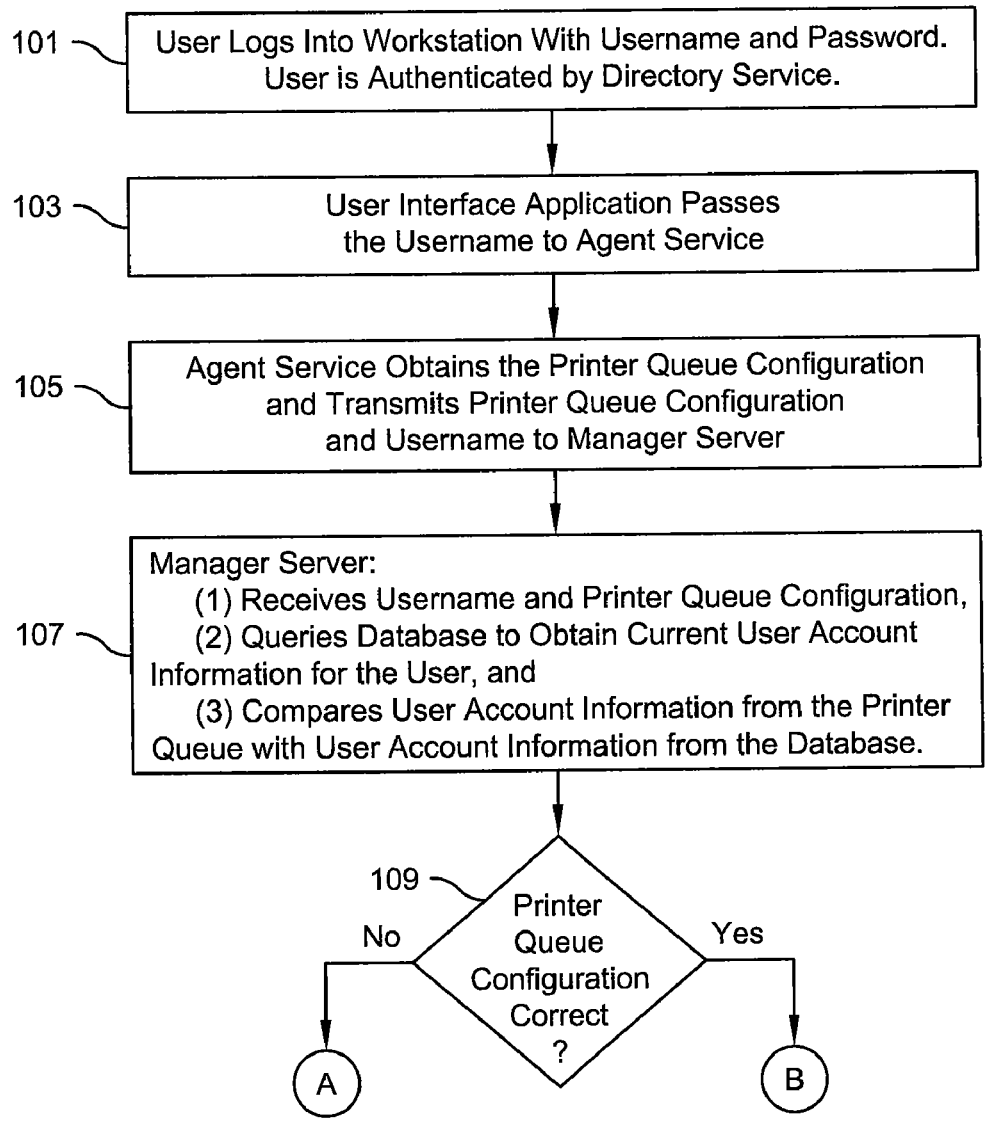
FIGS. 6A, 6B and 6C is a flow diagram of a process for configuring a workstation in accordance with the preferred embodiment.
Figure 6B:
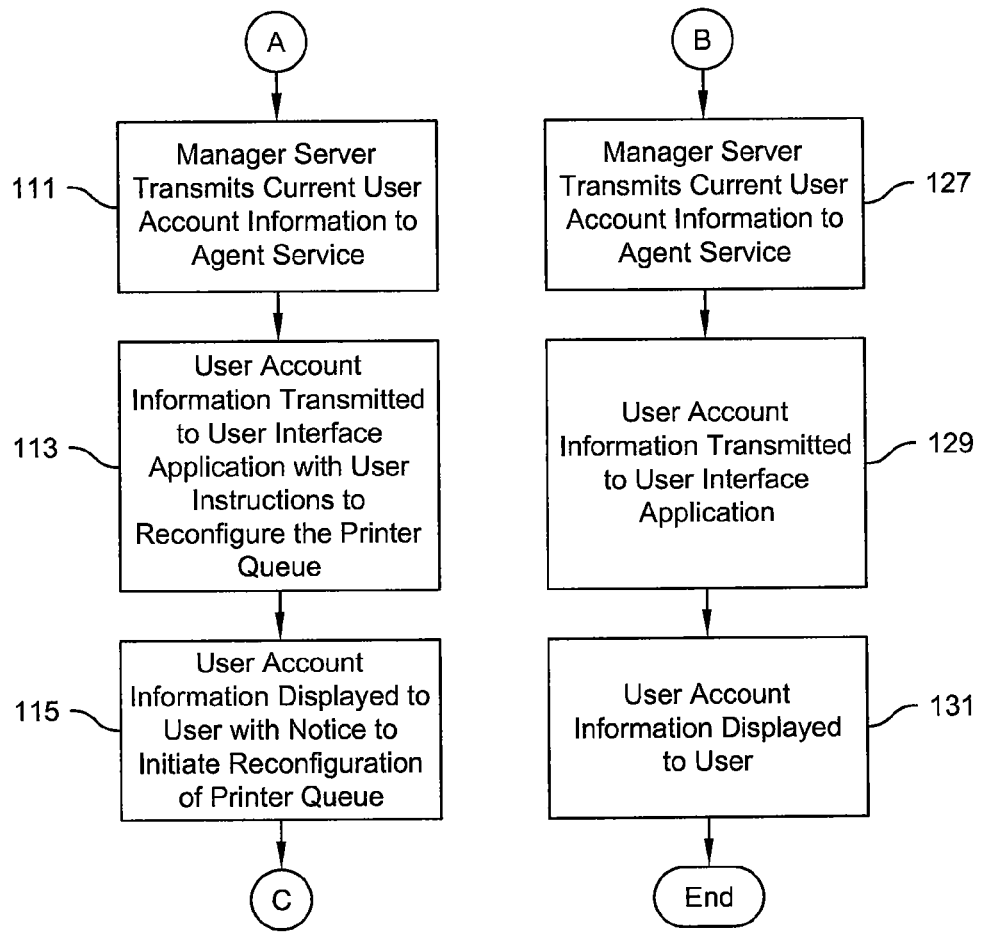
Figure 6C:
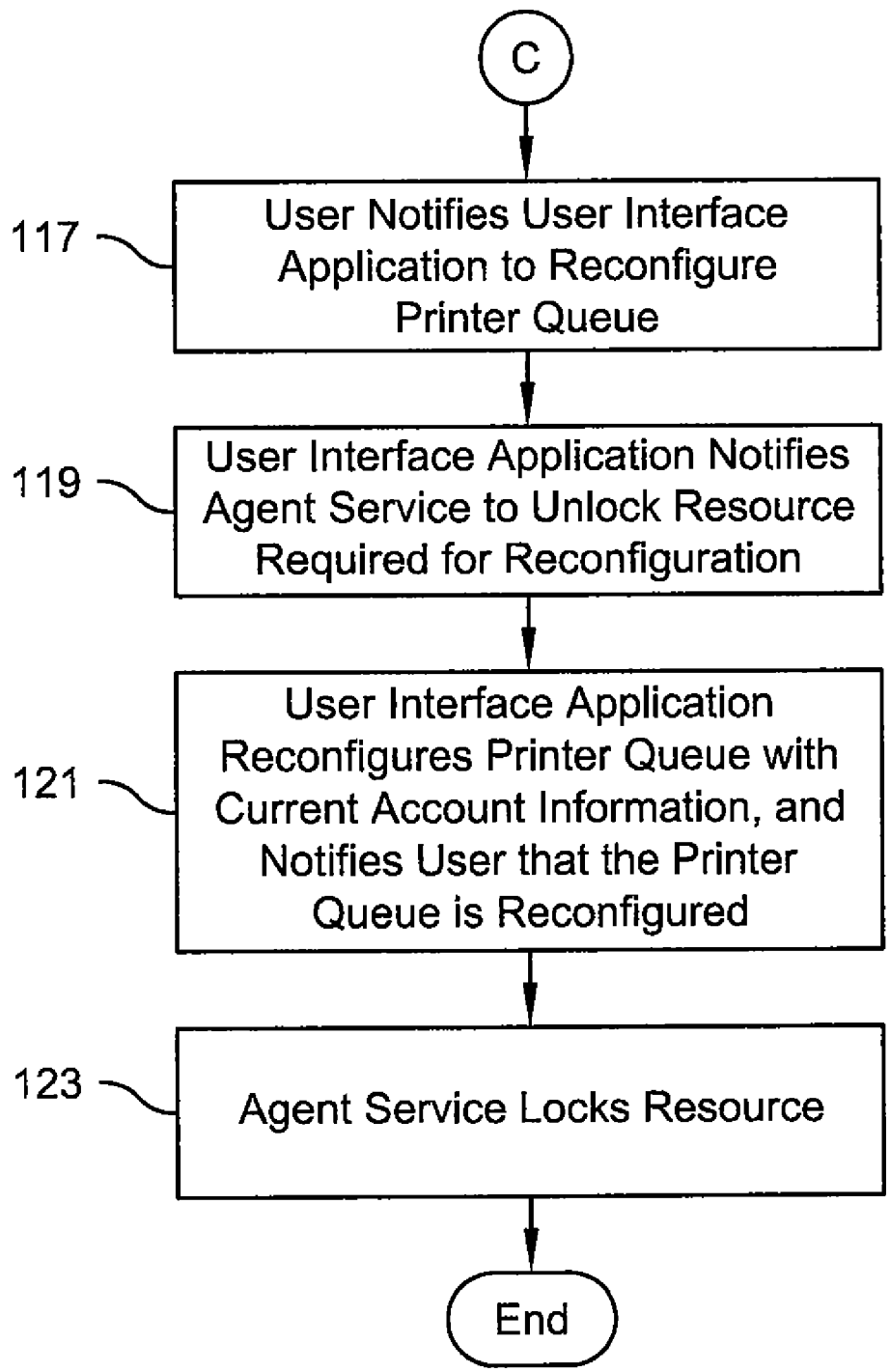

In the preferred embodiment access by a directory user 34 to a network device 20 or a local device 22 requires that the directory user's account identifier be included with a job. Also, if print security is enabled, a print identifier is required to be included with each print job in order that the job is performed. Referring now to FIGS. 6A-6C there is shown a preferred method for configuring a workstation 24 with the account identifier and the print identifier such that a directory user 34 can gain access to a network peripheral device 20 or a local peripheral device 22 and that the job can be performed by the network device 20 or the local device 22.

At step 101, the user logs into a workstation 24 with a username and password and is authenticated by the network directory service 30*a*. If the workstation agent 44 has been installed in the workstation 24, the user interface application 36 transmits the username to the agent service 38. (Step 103). (If the workstation agent 44 has not been installed, the user 34 is prompted to request that the administrator install the workstation agent 44.) The agent service 38 then obtains the configuration of the printer queue 50, i.e. the device drivers/ports, and transmits the configuration of the printer queue 50 and the username to the manager server 26. (Step 105). At step 107, the manager server 26 queries the database 28 to obtain the current account information 64 which corresponds to the username of the user 34 and compares the configuration of the printer queue 50 with current account information of the user 34. If the configuration of the printer queue 50 corresponds to the current user account information 64, i.e. the device drivers and ports correspond to the network devices 20 and the local devices 22 to which the user 34 has access (step 109), the manager server 26 transmits the current user account information 64 to the agent service 38 (step 127), the agent service 38 transmits the user account information 64 to the user interface application 36 (step 129), which in turn displays the current account information 64 to the user 34 including preferably, the user's account identifier, print identifier, color printing quota and current usage, and mono printing quota and current usage. (Step 131). The user 34 is then able to initiate a job to a network device 20 or local device 22.

If the configuration of the printer queue 50 does not conform to the current user account information 64 (step 109), either because the workstation 24 had been used previously by a different user 34 or the access rights of the directory user 34 are changed, the manager server 26 transmits the current user account information 64 to the agent service 38 with instructions enabling the user interface application 36 to reconfigure the printer queue 50. (Step 111).

At step 113, the agent service 38, transmits the account information 64 of the directory user 34 and the instructions to the user interface application 36 which displays the directory user's 34 account information 64 to the directory user 34 with a notice to initiate reconfiguration of the printer queue 50. (Step 115). Upon receiving notice from the user 34, (step 117), the user interface application 36 uses the instructions received from the manager server 26 to request the agent service 38, having system rights to the operating system of the workstation 24, to unlock the appropriate resource required to reconfigure the printer queue 50. (Step 119). The resource in different contexts may be, for instance, a registry location or a file. The user interface application 36 then reconfigures the printer queue 50 based on the current user account information 64, so as to include the account identifier and the print identifier of the directory user 34 with each job initiated at the workstation 24. The user interface application 36 then notifies the agent service 38 to lock the resource and notifies the directory user 34 that the printer queue 50 has been reconfigured. (Step 121). Upon the agent service 38 locking the resource at step 123, the directory user 34 is free to initiate a job.

As described above, the agent service 38 communicates with the manager server 26 on a periodic basis. The directory user 34 is notified of any discrepancy of account information 64 between the printer queue 50 and the manager server 26, preferably by a pop-up message. Also, the directory user 34 may configure the printer queue 50 at any time with a refresh command.

Upon the printer queue 50 being configured with the user's current account information 64, i.e. account identifier and print identifier, the manager server 26 periodically communicates with the agent service 38 to receive accounting data 62 from the workstation 24 and to transmit changes in the directory user's account information 64 to the agent service 38.

Operating System Logging

Operating systems such as Windows® have the capability for detecting and recording jobs that include data such as username, date/time, queue information destination port/address, document name job status, number of pages, etc. Consequently, an alternative or adjunct for collecting accounting data 62 for a directory user 34 is to collect information about the printer queue 50 and the and the print logs 35 in the workstation 24.

Figure 8:
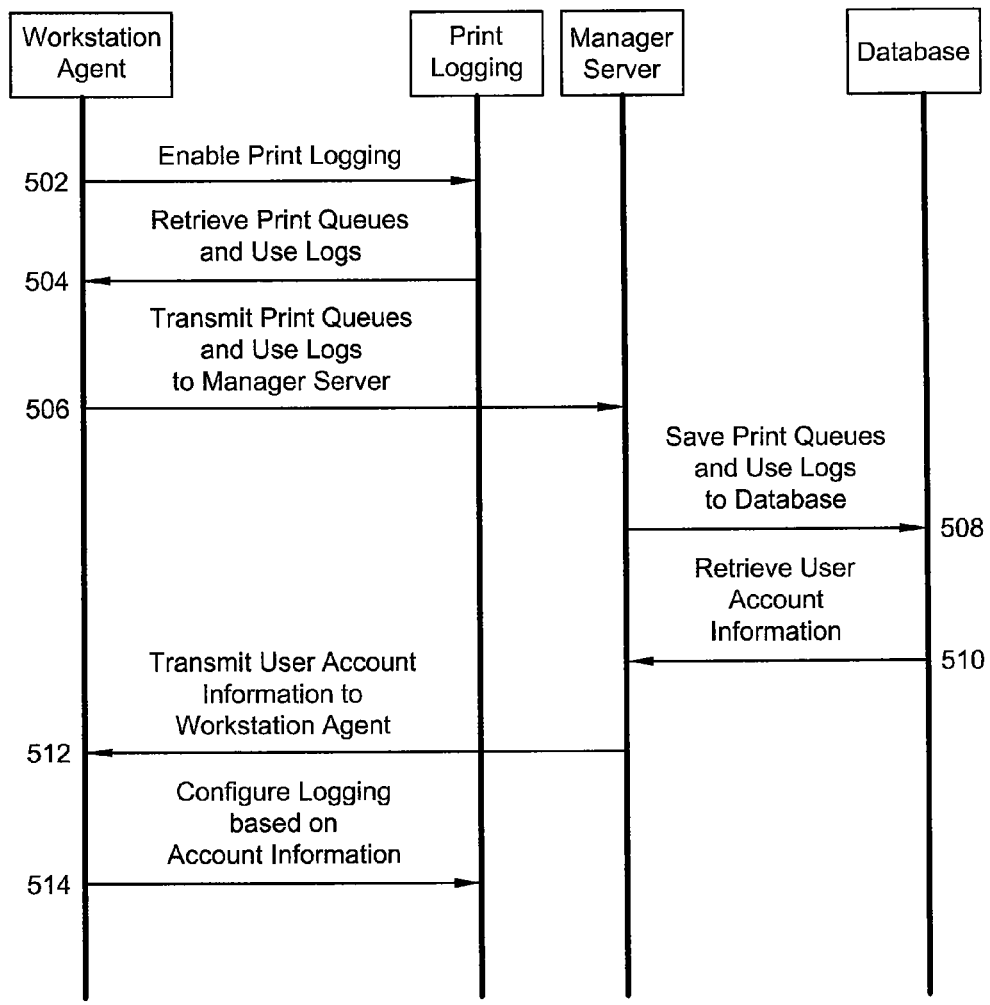
FIG. 8 is a diagram of a process for detecting and recording jobs initiated in a workstation in accordance with the preferred embodiment.

A preferred process for detecting and recording jobs initiated in the workstation 24 is shown in FIG. 8. At step 502, the agent service 38 enables job logging by interacting with the operating system. At step 504, the agent service 38 retrieves information about the print queues 37 and print log 35 using the operating system. At step 506, the agent service 38 transmits the information about the print queues 37 and the print log 35 to the manager server 26. At step 508, the manager server 26 saves the information about the print queues 37 and the print log 35 in the database 28. At step 510 and 512, the manager server 26 retrieves account information 64 for the logged-in directory user 34 from the database 28 and transmits the account information 64 to the workstation agent 44. The agent service 38 then configures logging in the workstation 24 based on the account information 64 based on the quotas etc. assigned to the logged-in directory user 34. Alternative to the operating system directly enabling logging, logging may be enabled by a computer program that subscribes to operating system events and processes the print events when they occur.

Usage Accounting in a Distributed System.

A preferred embodiment of the system 1 provides for comprehensive management and unified reporting of local devices 22 and network devices 20 of different types by leveraging existing functionality in the local devices 22 and network devices 20 and in the computing environment. Preferably the system 1 includes a manager server 26 which communicates with the network devices 20 by using protocols such as PJL customized to the type of each network device 20, embedded web-based accounting in the network devices 20 and third party accounting tools. The system 1 also includes an agent 44 included in one or more workstations 24 which includes an agent service 38. The agent service 38 provides access to the local devices 22 and nearby network devices 20, and access to print logging by the operating system of the workstations 24. The system 1 also includes a database 28 for storing device property data 66, account information 64 and accounting data 62. In addition, the system 1 includes provisions for receiving account information 64 from external services such as an active directory sever 30, CSV text or XML file, LDAP server, a Web service or a third party database. Also, the manager server 26 is capable if periodically receiving data from regional manger servers and an update service for updating information about devices and communication protocols.

Figure 9:
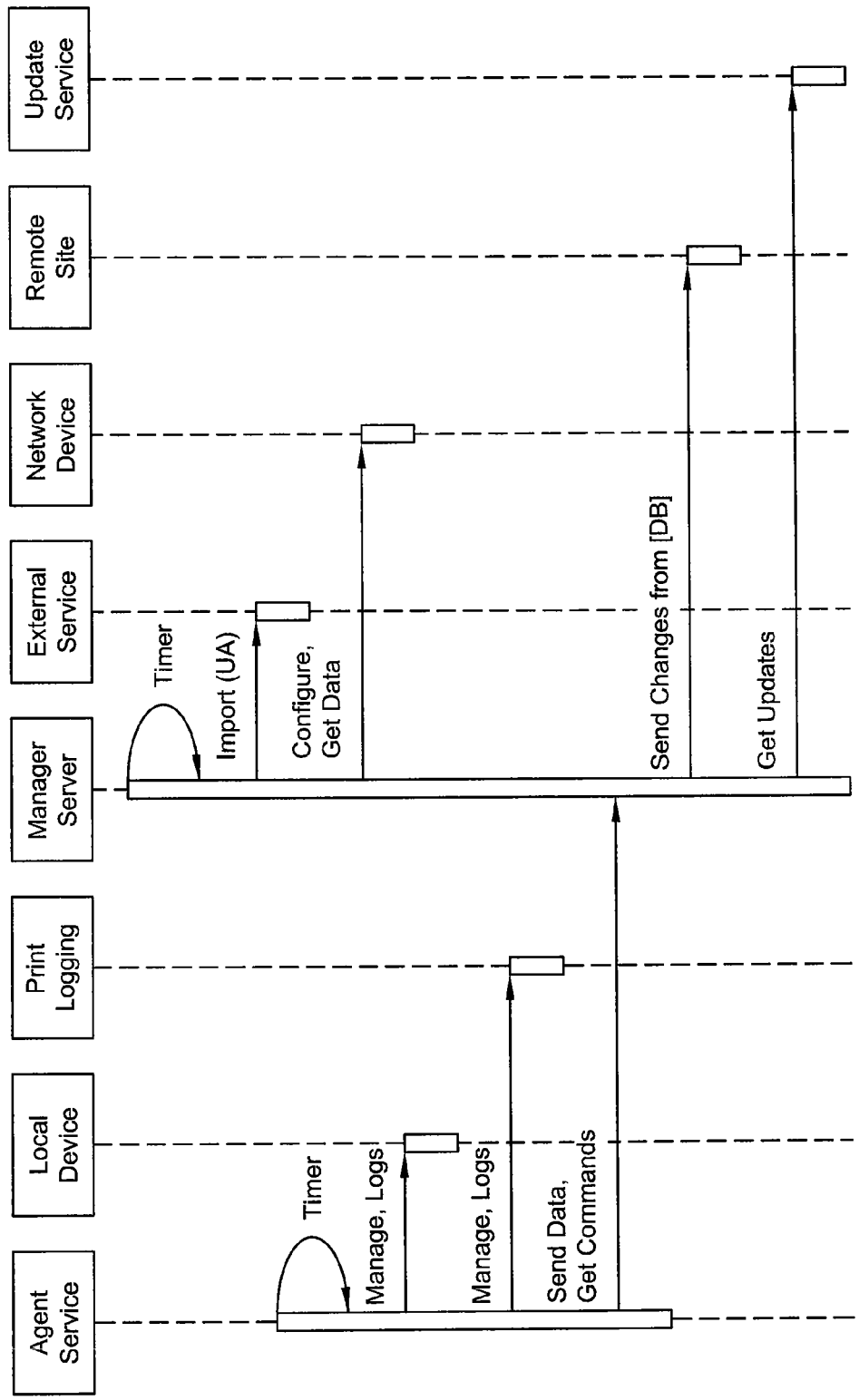
FIG. 9 is a diagram illustrating the communication between components of the peripheral device management system in accordance with the preferred embodiment.

In the system 1, Referring now to FIG. 9, the manager server 26 periodically imports the current configuration of user accounts from an external service such as active directory 30 and updates the database 28. The manager server 28 also acquires the current configuration of the network devices 20, and if accounting is enabled, current usage logs and/or counters from the network devices 20, and saves the usage logs and/or counters in the database 28. The protocols of communication are selected based on the type of device and detected device properties.

The manager server 28 also updates the account information 64 in each network device 20 by comparing the current configuration with expected account information stored in the database that possibly originated from an external service. Only differences between the current and expected values are transmitted to the network devices 20 in order to minimize network traffic.

The agent service 38 running on the workstations 24 inspects the operating system of the workstation 24 for print queues 37, and reports the information to the manager server 26 to save in the database 28. The agent service 38 also detects the local devices 22, collects data from the local devices 22 and transmits the data to the manager server 26. If accounting is enabled in the local device 22, the collected data includes logs or counters. Based on responses from the manager server 26, the agent service 38 configures accounting on the local devices 22.

The agent service 38 also is capable of enabling print logging by the operating system of the workstation 24 or by print event processing utilities. The data collected from the print log 35 is periodically transmitted to the manager server 26.

The manager server 26 periodically transfers changes from the database 28 to the remote servers for central management and integrated reporting. The manager server 26 also checks for updated information about the local devices 22 and network devices 20 and communication protocols.

Managing the Use of a Peripheral Device

Figure 7:
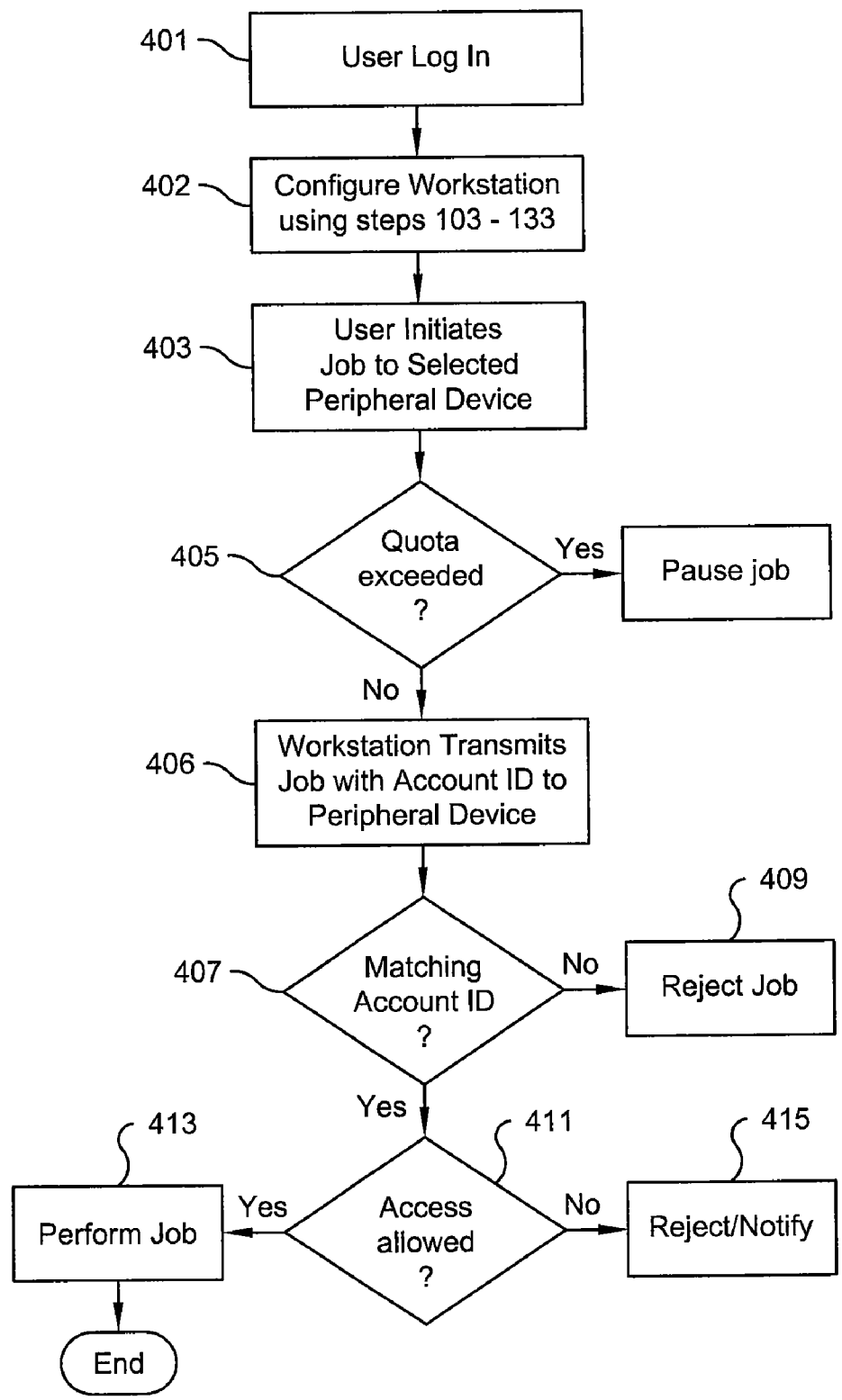
FIG. 7 is a flow diagram of a process for managing the use of a peripheral device in accordance with the preferred embodiment.

Referring now to FIG. 7 there is shown a preferred method for the system 1 to manage the use of network devices 20 and local devices 22 by directory users 34 according to the preferred embodiment. At step 401, a directory user 34 logs into a workstation 24 by inputting a username and a password. The username and the password are authenticated by the directory service 30a. The workstation 24 is now configured by the manager server 26 performing steps 103-133 shown in FIGS. 6A-6C. (Step 402). Upon the workstation 24 being configured, a directory user 34 may initiate a job to a network device 20 or a local device 22 for which the workstation 24 has been configured. (Step 403). Upon the directory user 34 initiating the job, step 405, the agent service 38 determines from the account information 64 whether the directory user 34 has been denied the requested service of the of the network device 20 or local device 22, or has exceeded the quota assigned by the manager server 26 for the service selected by the directory user 34. If the directory user 34 has been denied the requested service of the of the network device 20 or local device 22, or exceeded the quota, the print queue 37 is paused by the agent service 38, and the directory user 34 is unable to initiate any further jobs, including the requested service, to a network device 20 or local device 22 until the quota period is ended. Alternatively, among other possible options, the agent service 36 may issue a notice to the directory user 34 or to the administrator 32. If the job does not exceed the quota, the job is transmitted directly to the selected network devices 20 or local devices 22 with the directory user's 34 account identifier and optionally a print identifier included. (Step 406). Alternatively, the job may be transmitted to the selected network devices 20 via a printer server (not shown). At step 407, the account identifier included with the job is compared with the account identifiers stored in each network device 20 or local device 22 receiving the job. If a match to the account identifiers stored in the local device 20 or network device 22 is not found in the network device 20 or local device 22, the job is rejected by the network device 20 or local device 22. (Step 409). If a match is found, the network device 20 or local device 22 then determines whether directory user 34 has access to the requested service of the network device 20 or local device 22 by accessing the account information 64 stored in the network device or local device 22 specific to the directory user 34. (Step 411). If the directory user 34 does not have access to the requested service, the job is rejected. Alternatively, the job may be performed and a notice sent to the administrator 32 and/or the directory user 34.

While the preferred embodiment refers to printer queues, print logs and print jobs the type of jobs for which the invention is applicable is not limited to print jobs, but may be also copy jobs, scanning jobs and facsimile jobs. Also, where a quota is described as being included in the account information 64, such quota may be any kind of quota for a function performed by the network device 20 or local device 22 and be of unlimited number.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for controlling by a manager server, use by a user of a peripheral device, said peripheral device being one of a plurality of peripheral devices which are directly connected to the manager server via a network or are connected to the manager server via a workstation which is connected to the manager server via the network, the method comprising the steps of:
   periodically receiving in the manager server, accounting data specific to the user from each one of the peripheral devices for which the user has access rights, wherein each of the peripheral devices for which the user has access rights generates the accounting data specific to the user and periodically transmits the generated accounting data specific to the user to the manager server without receiving a request from the manager server, said manager server totaling the accounting data received from each of the peripheral devices to determine a usage by the user of the peripheral devices for a predetermined time period;
   storing in the manager server, account information specific to the user, the account information including at least one of a quota for the user to use a peripheral device, one or more services of the peripheral device for the predetermined period, the usage of the user for the predetermined time period, and permissions to use one or more of the services of the peripheral device; and
   periodically transmitting by the manager server to a workstation at which the user has logged-in, the account information specific to the user, wherein the periodic transmitting is performed without the manager server receiving a request for the account information specific to the user from the workstation at which the user has logged-in;
   wherein if the account information received by the workstation at which the user has logged in indicates that the user's usage exceeds the user's quota at the time that the user's account information is received by the workstation, print queues of the workstation at which the user has logged-in are paused for the balance of the predetermined time period or any pending jobs in the print queue are deleted from the print queue.

2. The method of claim 1, wherein the accounting data received in the manager server from each of the peripheral devices depends on an embedded accounting of each respective peripheral device and comprises either counter data, log data or no data.

3. The method of claim 1, wherein the accounting data received in the manager server further includes data received from the workstation at which the user has logged-in over the predetermined time period about the workstation printer queues and print logs.

4. The method of claim 1, further including the step of the manager server totaling the accounting data received from each of the peripheral devices and the data received from each workstation at which the user has logged-in over the predetermined time period to determine the usage of the peripheral devices by the user over the predetermined time period.

5. The method of claim 1, wherein the quota is unique to the user.

6. The method of claim 1, wherein the quota is at least a number of printed mono pages or a number of printed color pages.

7. The method of claim 1, wherein the plurality of peripheral devices includes any combination of printers, scanners, copiers, fax machines and multifunctional peripheral devices.

8. The method of claim 1, wherein the access rights for the user are granted by assigning the user to one or more user groups, and assigning individual ones of the peripheral devices to one or more of the user groups.

9. A method for controlling by a manager server, use of a plurality of peripheral devices by a user logged-in at a workstation, said workstation including one or more print queues, said manager server, workstation and peripheral devices being operatively connected on a network, the method comprising the steps of:
   storing in the manager server, account information specific to the user, the account information including an account identifier and permissions for the user to use one or more of the services of the peripheral devices;
   periodically transmitting the user's account information from the manager server to each of the peripheral devices to which the user has been granted access rights, the transmitting being performed without the manager server receiving a request for the user's account information from the respective peripheral devices; and
   configuring each print queue included in the workstation with the user's account identifier such that each job initiated by the user to one or more of the plurality of peripheral devices includes the account identifier;
   wherein, when a job initiated by the user from the workstation is received by one or more of the peripheral devices, each respective peripheral device compares the account identifier included in the job with the user's account information stored in the respective peripheral device, and if the account information associated with the account identifier provides for access to the respective peripheral device and for the requested service, the job is performed by the respective peripheral device.

10. The method of claim 9, wherein each print queue is configured at the time the user logs in at the workstation.

11. The method of claim 9, further including the step of assigning a print identifier to the user and configuring each print queue included in the workstation with the user's print identifier such that each job initiated by the user to one or more of the plurality of peripheral devices includes the print identifier.

12. The method of claim 9, wherein the access rights for the user are granted by assigning the user to one or more user groups, and assigning individual ones of the peripheral devices to one or more of the user groups.

13. The method of claim 9, wherein the plurality of peripheral devices includes any combination of printers, scanners, copiers, fax machines and multifunctional peripheral devices.

14. A workstation for use by a user to transmit a job to a peripheral device, said peripheral device being one of a plurality of peripheral devices, the workstation comprising:
one or more print queues configured to temporarily store one or more jobs destined to be transmitted to the peripheral device; and
an agent configured to periodically receive, from a manager server, without the workstation transmitting a request to the manager server, (i) a quota for the user to use the plurality of peripheral devices during a predetermined time period, and (ii) a usage of the user indicating the use by the user of the peripheral devices in the predetermined time period, wherein the usage of the user is based on each of the peripheral devices for which the user has access rights generating accounting data specific to the user and transmitting it to the manager server, wherein if the usage of the user exceeds the quota of the user during the predetermined time period, the agent at least one of (i) notifies the user that the quota is exceeded and (ii) prevents the one or more jobs stored in the one or more print queues from being transmitted,
wherein the agent further receives an account identifier of the user from the manager server when the user logs in at the workstation and configures each print queue with the user's account identifier, and
if the user's usage exceeds the user's quota at the time that the user's account identifier is received by the workstation, the print queues of the workstation at which the user has logged-in are paused for the balance of the predetermined time period or any pending jobs in the print queues are deleted from the print queues, and
if the user's quota is not exceeded, the account identifier in each job initiated by the user from the workstation and received by the one or more of the peripheral devices is compared with the account identifiers stored in each respective peripheral device, and if the account information associated with the account identifier provides for access to the respective peripheral device and for the requested service, the job is performed by the respective peripheral device.

15. The workstation of claim 14, wherein the agent provides the user with the quota and the usage when the user logs in at the workstation and periodically thereafter.

16. The workstation of claim 14, wherein the one or more jobs are prevented from being transmitted by pausing the job queue or deleting the one or more jobs from the print queues.

17. The workstation of claim 14, wherein the peripheral device is locally connected to the workstation, and the agent periodically retrieves the use by the user of the locally connected peripheral device, and periodically transmits the use by the user of the locally connected peripheral device to the manager server.

18. A method for controlling by a manager server, use of a peripheral device by a user logged-in at one of a plurality of workstations connected to the manager server via a network, each workstation including one or more print queues, said peripheral device being one of a plurality of peripheral devices which are directly connected to the manager server via the network, or are connected to the manager server via the workstation at which the user has logged-in, the method comprising the steps of:
periodically receiving in the manager server, accounting data specific to the user from each one of the peripheral devices for which the user has access rights, wherein each of the peripheral devices for which the user has access rights generates the accounting data specific to the user and periodically transmits the generated accounting data specific to the user to the manager server without receiving a request from the manager server, and accounting data received from each workstation at which the user has logged-in, said manager server totaling the accounting data from the peripheral devices and each workstation at which the user has logged-in are totaled over a predetermined time period to determine a usage by the user of the peripheral devices for the predetermined time period;
storing in the manager server, account information specific to the user, the account information including at least one of an account identifier, a quota for the user to use the peripheral device, one or more services of the peripheral device for the predetermined time period, the usage of the user for the predetermined time period, and permissions to use one or more of the services of the peripheral device;
periodically transmitting the user's account information from the manager server to the workstation at which the user has logged-in and to each of the peripheral devices to which the user has been granted access rights, wherein the periodic transmitting is performed without the manager server receiving a request for the user's account information from the workstation at which the user has logged-in; and
configuring each print queue included in the workstation with the user's account identifier at the time that the user logs in at the workstation, such that each job initiated by the user to one or more of the plurality of peripheral devices includes the account identifier;
wherein if the account information received by the workstation at which the user has logged in indicates that the user's usage exceeds the user's quota at the time that the user's account information is received by the workstation, the print queues of the workstation at which the user has logged-in are paused for the balance of the predetermined time period or any pending jobs in the print queues are deleted from the print queues, and
if the user's quota is not exceeded, the account identifier in each job initiated by the user from the workstation and received by the one or more of the peripheral devices is compared with the account identifiers stored in each respective peripheral device, and if the account information associated with the account identifier provides for access to the respective peripheral device and for the requested service, the job is performed by the respective peripheral device.

* * * * *